United States Patent
Yoshii et al.

(10) Patent No.: US 7,545,873 B2
(45) Date of Patent: Jun. 9, 2009

(54) RADIO TRANSMISSION APPARATUS, RADIO RECEPTION APPARATUS AND RADIO TRANSMISSION METHOD

(75) Inventors: Isamu Yoshii, Urayasu (JP); Masaru Fukuoka, Kanazawa (JP)

(73) Assignee: Panasonic Corporation, Osaka (JP)

( * ) Notice: Subject to any disclaimer, the term of this patent is extended or adjusted under 35 U.S.C. 154(b) by 571 days.

(21) Appl. No.: 10/573,817

(22) PCT Filed: Sep. 29, 2004

(86) PCT No.: PCT/JP2004/014216

§ 371 (c)(1),
(2), (4) Date: Mar. 28, 2006

(87) PCT Pub. No.: WO2005/032021

PCT Pub. Date: Jul. 4, 2005

(65) Prior Publication Data

US 2007/0135049 A1  Jun. 14, 2007

(30) Foreign Application Priority Data

Sep. 30, 2003  (JP)  ............................. 2003-341653

(51) Int. Cl.
*H04L 23/02*  (2006.01)
(52) U.S. Cl. ...................................................... 375/261
(58) Field of Classification Search ......... 375/260–262, 375/267, 285, 295, 298–299, 316, 341, 346; 370/206, 210; 714/786–788, 795
See application file for complete search history.

(56) References Cited

U.S. PATENT DOCUMENTS

| 5,923,711 | A | 7/1999 | Willming | |
|---|---|---|---|---|
| 6,185,594 | B1 * | 2/2001 | Hilton et al. | ................. 708/270 |
| 6,658,605 | B1 * | 12/2003 | Yoshida et al. | ............... 714/702 |
| 6,687,307 | B1 * | 2/2004 | Anikhindi et al. | ............ 375/260 |
| 2006/0008031 | A1 * | 1/2006 | Vummintala et al. | ......... 375/299 |

FOREIGN PATENT DOCUMENTS

| JP | 11507194 | 6/1999 |
|---|---|---|
| JP | 2003060615 | 2/2003 |
| JP | 2003101972 | 4/2003 |

OTHER PUBLICATIONS

PCT International Search Report dated Dec. 14, 2004.
"Modulation diversity for OFDM," 3GPP, TSG RAN Working Group 1 Meeting #31 R1-030156, Feb. 21, 2003.
J. Boutros, et al., "Signal Space Diversity: A Power-and Bandwidth-Efficient Diversity Technique for the Rayleigh Fading Channel," IEEE Transactions on Information Theory, vol. 44, No. 4, pp. 1453-1464, Jul. 1998.

* cited by examiner

Primary Examiner—Khanh C Tran
(74) Attorney, Agent, or Firm—Dickinson Wright, PLLC

(57) ABSTRACT

A radio transmission apparatus capable of enhancing the diversity effect. In this apparatus, phase rotation section (102) performs phase rotation processing of 40.6°=26.6°+14.0°, interleavers (106,111) perform two-time interleaving processing before IQ combining processing performed in a combining section (107) and after IQ separation processing performed in an IQ separating section (108), and the original modulation symbol obtained in a mapping section (101) is thereby dispersed and mapped to/at signal points of M-ary modulation level higher two ranks or more (for example, from a QPSK symbol to 256QAM symbols).

9 Claims, 14 Drawing Sheets

RADIO TRANSMISSION APPARATUS, RADIO RECEPTION APPARATUS AND RADIO TRANSMISSION METHOD

TECHNICAL FIELD

The present invention relates to a radio transmission apparatus, radio reception apparatus and radio transmission method particularly using a modulation diversity system.

BACKGROUND ART

In recent years, attention has been drawn to multicarrier communication apparatuses using an OFDM (Orthogonal Frequency Division Multiplexing) system as apparatuses enabling high-rate radio transmission, because such communication apparatuses have resistance to multipath and fading and permit high-quality communication. Further, using modulation diversity techniques has been proposed for performing phase rotation and interleaving on modulation symbols such as QPSK (Quadrature Phase Shift Keying) and thereby enabling the diversity effect to be obtained.

Modulation diversity is described in Non-patent Document 1, for example. Referring to FIG. 1, modulation diversity will be described briefly. FIG. 1 shows a case of using QPSK (Quadrature Phase Shift Keying) as a modulation scheme as an example. First, a transmitting side rotates a phase of a symbol mapped on the IQ plane by a predetermined angle. Next, the transmitting side performs interleaving on an I (in-phase) component and Q (quadrature) component using uniform or random interleavers respectively for the I component and Q component. By this means, signals subjected to inverse fast Fourier transform (IFFT) are processed such that the I component and Q component of the symbol prior to interleaving are mapped to different subcarriers. In FIG. 1, the I component is mapped to a subcarrier B, while the Q component is mapped to a subcarrier A.

First, a receiving side performs fast Fourier transform (FFT), and thereby extracts the I component and Q component multiplexed on the subcarriers. Next, the receiving side performs deinterleaving, and thereby restores the I component and Q component to original arrangements. Then, the receiving side performs demapping processing based on a constellation of the restored I component and Q component, and thereby obtains reception data.

Here, assuming that the subcarrier A has a good channel state and that the subcarrier B has a poor channel state, the receiving side obtains a constellation distorted in the Q-component direction as shown in FIG. 1. By this means, it is possible to maintain a signal point distance on the constellation at a relatively long, and to restore bits in a packet accurately averagely at a demapping. Thus, in modulation diversity, even when the fading variation occurs on each subcarrier due to multipath fading, the same effect can be obtained as in dispersing a SNR (Signal-to-Noise Ratio) in the subcarrier direction to make a correction. As a result, the modulation symbol undergoes the variation as if the signal is transmitted on an AWGN (Additive White Gaussian Noise) communication path, and the diversity gain can thus be obtained.

FIG. 2 illustrates a configuration of multicarrier transmission apparatus 10 that performs modulation diversity transmission processing. FIG. 3 illustrates a configuration of multicarrier reception apparatus 30 that receives and demodulates signals from the apparatus 10.

Multicarrier transmission apparatus 10 has modulation diversity modulation section 11, and inputs transmission data to mapping section 12 in modulation diversity modulation section 11. Mapping section 12 maps the transmission data on symbols on the IQ plane corresponding to a modulation scheme such as BPSK, QPSK, 16QAM and the like.

Phase rotation section 13 rotates the phase of a mapped symbol by a predetermined angle. IQ separating section 14 separates the symbol with the phase rotated into the I component and Q component. The separated I and Q components are temporarily stored respectively in buffers 15 and 16. The Q component stored in buffer 16 is interleaved in interleaver 17 and output to combining section 18. In addition, although FIG. 2 illustrates the case of interleaving the Q component, the I component may be subjected to interleaving processing, or both the I and Q components may be subjected to interleaving processing.

Combining section 18 combines the I component output from buffer 15 and the Q component output from interleaver 17 to place back in a constellation. A modulation diversity symbol is thereby obtained. The modulation diversity symbol is multiplexed on a predetermined subcarrier in serial/parallel transform (S/P) section 19 and inverse fast Fourier transform (IFFT) section 20. In other words, serial/parallel transform (S/P) section 19 and inverse fast Fourier transform (IFFT) section 20 map the modulation diversity symbol to any one of a plurality of subcarriers orthogonal to one another, and sequentially modulate each of the subcarrier with the modulation diversity symbol.

Thus, in multicarrier transmission apparatus 10, since interleaver 17 interleaves the Q component, the I component is fixed to some subcarrier, while a subcarrier to which the Q component is mapped varies according to interleaving patterns. An IFFT-processed signal is subjected to radio transmission processing such as analog/digital conversion processing, upconverting and the like in radio transmission section 21, and then transmitted via antenna 22.

Multicarrier reception apparatus 30 that receives and demodulates signals transmitted from multicarrier transmission apparatus 10 has modulation diversity demodulation section 31. In multicarrier reception apparatus 30, radio reception section 33 performs radio reception processing such as downconverting, analog/digital conversion processing and the like on a radio signal received in antenna 32 to output to fast Fourier transform (FFT) section 34. FFT section 34 extracts a modulation diversity symbol multiplexed on each subcarrier. Phase compensation section 35 compensates the extracted modulation diversity symbol for a phase variation occurring during propagation. The phase-compensated modulation diversity symbol is output to IQ separating section 36 inmodulation diversity demodulation section 31.

IQ separating section 36 separates symbols into the I component and Q component. Of the separated components, IQ separating section 36 outputs one component that is not interleaved at the transmitting side to combining section 40 via buffer 37 without any processing, while outputting the other component interleaved at the transmitting side to deinterleaver 39 via buffer 38. Deinterleaver 39 performs processing inverse to that in interleaver 17, and thereby restores interleaved components to an original arrangement and outputs to combining section 40. As a result, combining section 40 obtains a symbol comprised of the original pair of I component and Q component.

Phase rotation section 41 rotates the phase of the combined symbol in the inverse direction by the same angle to/as in phase rotation section 13 of the transmitting side. Demapping section 42 demaps the phase-rotated symbol and thereby outputs reception data.

Here, FIG. 4 illustrates modulation symbols that are subjected to QPSK modulation in mapping section 12 and then phase rotation processing of 26.6° in phase rotation section 13. As can be seen from FIG. 4, the modulation symbols are mapped at points of 16QAM at an angle of 26.6 degrees.

FIG. 5 illustrates I components and Q components combined in combining section 18. In FIG. 5, numerals "1" to "4" denote respective numbers of four QPSK symbols. I components are not interleaved, and therefore, the I components of modulation symbols are input to combining section 18 in the same order. In contrast thereto, the order of the Q components is rearranged by interleaving and input to combining section 18.

Here, four modulated symbols in mapping section 12 are expressed as $S^0=[S_1^0\ S_2^0\ S_3^0\ S_4^0]=[(1\ 1), (-1\ 1), (1\ -1), (-1\ -1)]$, where numerical subscripts "1" to "4" respectively represent four symbols obtained by QPSK, and a numerical superscript "0" represents a transmission symbol. Then, for example, using the I component and Q component, symbol 1 is represented as $S_1^0=(S_{1I}^0, S_{1Q}^0)$.

When Q components are interleaved with an interleaving pattern as shown in FIG. 5, symbol S obtained in combining section 18 is represented as $S=[(S_{1I}^0, S_{4Q}^0), (S_{2I}^0, S_{1Q}^0), (S_{3I}^0, S_{2Q}^0), (S_{4I}^0, S_{3Q}^0)]=[(1\ 1\ -1\ -1), (-1\ 1\ 1\ 1), (1\ -1\ -1\ 1), (-1\ -1\ 1\ -1)]$. This corresponds to transmitting either point on 16QAM corresponding to the interleaving pattern.

Assuming that the interleaving pattern as shown in FIG. 5 is used at the transmitting side, since an original first symbol is transmitted in the received first symbol and second symbol, to obtain the original first symbol, the receiving side separates the received symbols into I components and Q components, deinterleaves the Q components, and obtains the original first symbol by combining. Here, FIG. 6 shows a constellation in the case of obtaining an original one symbol by combining when a received symbol is represented as $S^{r1}=[S_1^{r1}, S_2^{r1}, S_3^{r1}, S_4^{r1}]$ (where numerical subscripts "1" to "4" respectively represent different symbols, and a numerical superscript "r1" represents a received symbol.) Four points in FIG. 6 are candidates for reception points. In addition, although in FIG. 6, length of $|S_{1I}^{r1}|$ and $|S_{2Q}^{r1}|$ are shown with almost the same, the lengths are actually different from each other due to the difference in fading and the like imposed on the symbol and four points in the figure form a parallelogram.

Thus, it is a feature of the modulation diversity system to transmit components of an original symbol in different symbols and to avoid the both components of symbol restored at the receiving side becoming smaller. Particularly, when this system is used in OFDM, it is possible to obtain large diversity gains because each subcarrier undergoes different fading.

[Non-patent Document 1] Signal space diversity: a power- and bandwidth-efficient diversity technique for the Rayleigh fading channel, Boutros, J.; Viterbo, E.; Information Theory, IEEE Transactions on Volume: 44 Issue: 4, July 1998, Page(s) z : 1453 -1467

DISCLOSURE OF INVENTION

Problems to be Solved by the Invention

In modulation diversity as described above, when either of I and Q components of an original symbol maintains its gain to some extent, the possibility is high that the original data is demodulated properly. For example, as shown in FIG. 5, under circumstances where the I component of symbol 1 is mapped at subcarrier 1 and its Q component is mapped at subcarrier 2, even when the channel quality of subcarrier 1 is poor and the channel quality of subcarrier 2 is good, it is possible to reduce the error in decision on symbol 1. Similarly, with respect to symbol 2, when either channel quality of subcarrier 2 mapped the I component and subcarrier 3 mapped the Q component is good, it is possible to reduce the error in decision on symbol 2.

However, when the both channel qualities are poor in subcarriers 1 and 2, the decision error of symbol 1 becomes large. Similarly, when the both channel qualities are poor in subcarriers 2 and 3, the decision error of symbol 2 becomes large.

It is an object of the present invention to provide a radio transmission apparatus and radio transmission method enabling the diversity effect to be further enhanced in performing the modulation diversity transmission processing.

Means for Solving the Problem

In the present invention, in performing the modulation diversity processing, phase rotation processing is performed such that an original symbol is mapped at a signal point of a higher modulation level by two ranks or more, and interleaving processing is performed on the I component and/or Q component a plurality of times.

A radio transmission apparatus of the present invention adopts a configuration provided with a phase rotator which rotates a phase of a modulation symbol and maps a signal point of the modulation symbol at a signal point of an M-ary modulation level higher by two ranks or more, and a plurality of interleavers that performs interleaving processing a plurality of times on the I component and/or Q component of the modulation symbol with the phase rotated.

According to this configuration, the original modulation symbol is mapped at symbols of the higher modulation level by two ranks or more to be dispersed, and it is thereby possible to enhance the diversity effect. For example, when the original modulation symbol is a QPSK symbol, the original symbol is dispersed and mapped to/at symbols of the modulation level of 256QAM or more.

A radio transmission apparatus of the invention adopts a configuration provided with a modulator that maps transmission data on a modulation symbol comprised of an I component and a Q component, a phase rotator that rotates a phase of the modulation symbol by a predetermined angle and maps a signal point of the modulation symbol at a signal point of an M-ary modulation level higher by two-rank, a first IQ separator that separates the modulation symbol with the phase rotated to the I component and the Q component with reference to an IQ axis rotated a predetermined angle, a first interleaver that interleaves the I component and/or the Q component separated in the first IQ separator, a first IQ combiner that combines the I component and the Q component output from the first interleaver, a second IQ separator that separates the modulation symbol obtained in the first IQ combiner into the I component and the Q component, a second interleaver that interleaves the I component and/or the Q component separated in the second IQ separator, a second IQ combiner that combines the I component and the Q component output from the second interleaver, and a transmitter that transmits the symbol obtained in the second IQ combiner.

According to this configuration, first, the phase rotator maps an original modulation symbol at a signal point of a two-rank higher modulation level. In other words, when the modulation symbol is of QPSK, the symbol is mapped on 256QAM while being inclined a predetermined angle. Next, the first IQ separator separates the QPSK symbol existing on 16QAM inclined a predetermined angle on 256QAM into an I component and Q component, the component(s) is interleaved in the first interleaver, both components are combined in the first IQ combiner, and the original QPSK symbol is thus dispersed on 16QAM inclined the predetermined angle on 256QAM. The IQ components separated in the second IQ separator are interleaved in the second interleaver, both components are combined in the second IQ combiner, and the original QPSK symbol is thus dispersed on 256QAM. As a result, the original modulation symbol is dispersed and mapped to/at signal points of the two-rank higher modulation level, and it is thus possible to obtain the significant diversity effect. For example, a QPSK symbol is capable of obtaining the diversity gain of maximum four symbols as compared with conventional modulation diversity that obtains the diversity gain of two symbols.

A radio transmission apparatus of the invention adopts a configuration provided with a modulator that maps transmission data on a modulation symbol comprised of an I component and a Q component, a first phase rotator that rotates a phase of the modulation symbol by a predetermined angle and maps a signal point of the modulation symbol at a signal point of a one-rank higher M-ary modulation level, a first IQ separator that separates the modulation symbol with the phase rotated to the I component and the Q component, a first interleaver that interleaves the I component and/or the Q component separated in the first IQ separator, a first IQ combiner that combines the I component and the Q component output from the first interleaver, a second phase rotator that rotates a phase of the modulation symbol obtained in the first IQ combiner by a predetermined angle and maps a signal point of the modulation symbol at a signal point of a one-rank higher M-ary modulation level, a second IQ separator that separates the modulation symbol with the phase rotated into the I component and the Q component, a second interleaver that interleaves the I component and/or the Q component separated in the second IQ separator, a second IQ combiner that combines the I component and the Q component output from the second interleaver, and a transmitter that transmits the symbol obtained in the second IQ combiner.

According to this configuration, first, the first phase rotator maps an original modulation symbol at a signal point of a one-rank higher modulation level. In other words, when the modulation symbol is of QPSK, the symbol is mapped on 16QAM while being inclined a predetermined angle. Next, the I component and/or Q component separated in the first IQ separator is interleaved in the first interleaver, both components are combined in the first IQ combiner, and the original QPSK symbol is thus dispersed on 16QAM. Next, the second phase rotator maps the 16QAM-symbol at a signal point of a one-rank higher modulation level. In other words, the 16QAM-symbol is mapped on 256QAM while being inclined a predetermined angle. Next, the I component and/or Q component separated in the second IQ separator is interleaved in the second interleaver, both components are combined in the second IQ combiner, and the original QPSK symbol is thus dispersed on 256QAM. As a result, the original modulation symbol is dispersed and mapped to/at signal points of a two-rank higher modulation level, and it is thus possible to obtain the significant diversity effect. For example, a QPSK symbol is capable of obtaining the diversity gain of maximum four symbols as compared with conventional modulation diversity that obtains the diversity gain of two symbols.

The radio transmission apparatus of the invention adopts a configuration where the modulator performs QPSK modulation, the phase rotator rotates the phase by 26.6°+14.0°, and the first IQ separator separates into the I component and the Q component with reference to the IQ axis inclined 14.0°.

According to this configuration, it is possible to obtain 256QAM modulation diversity symbols from a QPSK symbol.

The radio transmission apparatus of the invention adopts a configuration where the modulator performs BPSK modulation, the phase rotator rotates the phase by 45.0°+26.6°, and the first IQ separator separates into the I component and the Q component with reference to the IQ axis inclined 26.6°.

According to this configuration, it is possible to obtain 16QAM modulation diversity symbols from a BPSK symbol.

The radio transmission apparatus of the invention adopts a configuration where the modulator performs QPSK modulation, the first phase rotator rotates the phase by 26.6°, and the second phase rotator rotates the phase by 14.0°.

According to this configuration, it is possible to obtain 256QAM modulation diversity symbols from a QPSK symbol.

The radio transmission apparatus of the invention adopts a configuration where the modulator performs BPSK modulation, the first phase rotator rotates the phase by 45.0°, and the second phase rotator rotates the phase by 26.6°.

According to this configuration, it is possible to obtain 16QAM modulation diversity symbols from a BPSK symbol.

The radio transmission apparatus of the invention adopts a configuration where the transmitter maps the symbol obtained in the second IQ combiner to one of a plurality of subcarriers orthogonal to each other, and thereby modulates each of the subcarriers with the mapped symbol to transmit.

According to this configuration, an original symbol is dispersed to symbols of a higher modulation level by two ranks or more by modulation diversity of the invention, the symbols are dispersed to a plurality of subcarriers and transmitted, and it is thus possible to enhance the probability that the original symbol is transmitted without error even when some subcarrier has poor channel quality.

A radio reception apparatus of the invention adopts a configuration provided with an IQ separator that separates a received signal into an I component and a Q component, a deinterleaver that performs deinterleaving processing on the separated I component and/or Q component, an IQ combiner that combines deinterleaved components, a phase rotator that rotates a phase of a symbol combined in the IQ combiner by a predetermined angle, an LLR combiner that calculates log-likelihood ratio (LLR) for each bit in the symbol with the phase rotated, separates a value of LLR for each bit into an I component and a Q component, performs deinterleaving processing on a value of LLR for each bit of the I component and/or the Q component, and combines values of LLR of the I component and the Q component subjected to deinterleaving, and a demodulator that demaps the LLR-combined symbol to obtain reception data.

According to this configuration, a symbol of a higher modulation level by one rank than that of an original modulation symbol, that is obtained in the IQ combiner, undergoes different fading for each symbol, and therefore, the constellation is not a square. However, the LLR combiner performs LLR combining using the value of LLR for each bit in the symbol, and thereby combines information of the I component and Q component of the original symbol, the symbol is then demodulated, and it is thus possible to restore and demodulate the original symbol with excellence.

Advantageous Effect of the Invention

According to the invention, it is possible to improve the diversity effect.

BRIEF DESCRIPTION OF DRAWINGS

FIG. 15 is a diagram showing a constellation of 16QAM;

BEST MODE FOR CARRYING OUT THE INVENTION

Embodiments of the invention will specifically be described below with reference to accompanying drawings.

EMBODIMENT 1

Figure 7:
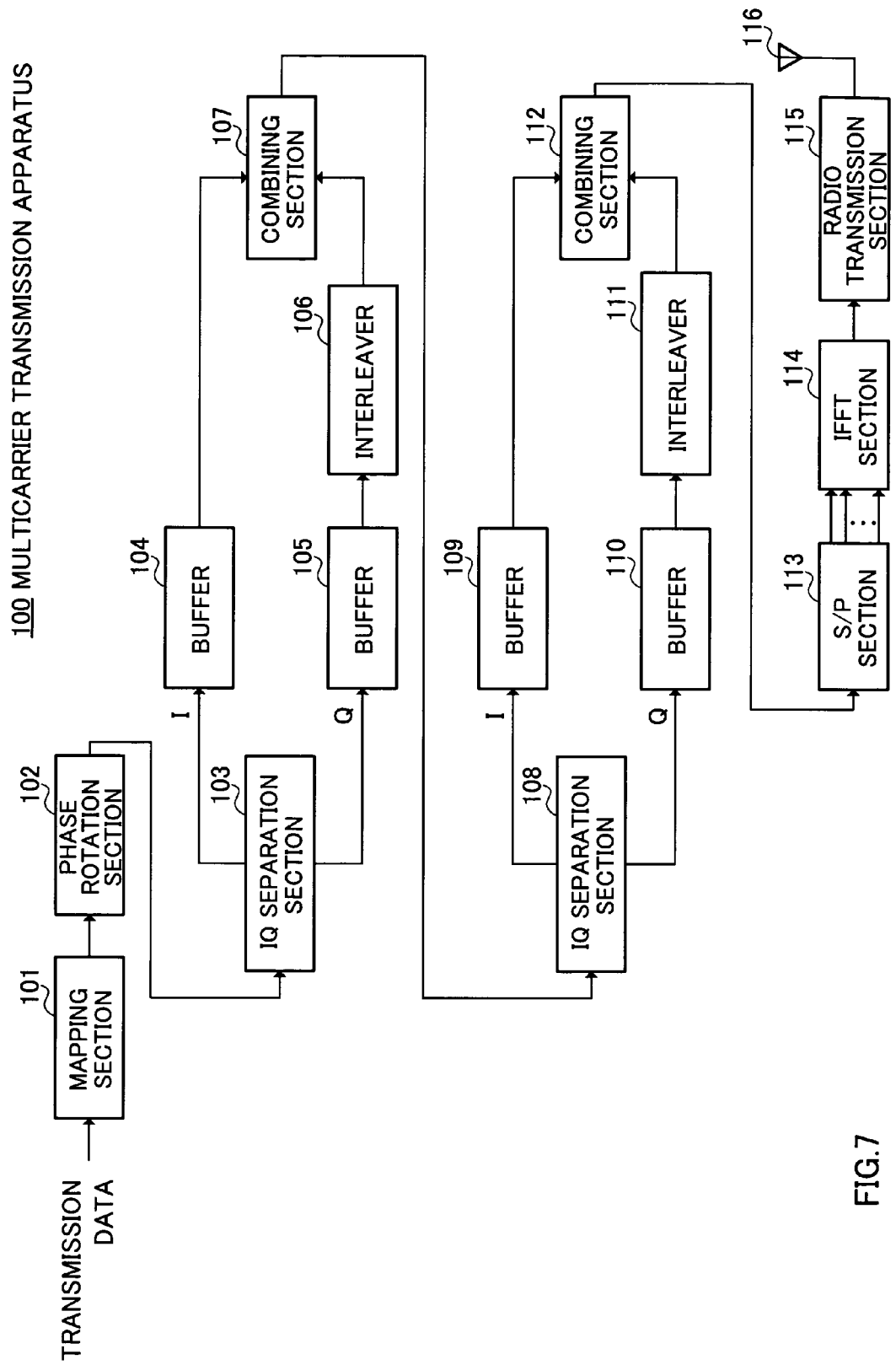
FIG. 7 is a block diagram illustrating a configuration of a multicarrier transmission apparatus according to Embodiment 1 of the invention.

FIG. 7 illustrates a configuration of a multicarrier transmission apparatus to which the present invention is applied. Multicarrier transmission apparatus 100 inputs transmission data to mapping section 101 as modulation means. Mapping section 101 performs QPSK modulation, and thereby maps transmission data on either one of four signal points on the IQ plane.

Figure 8:
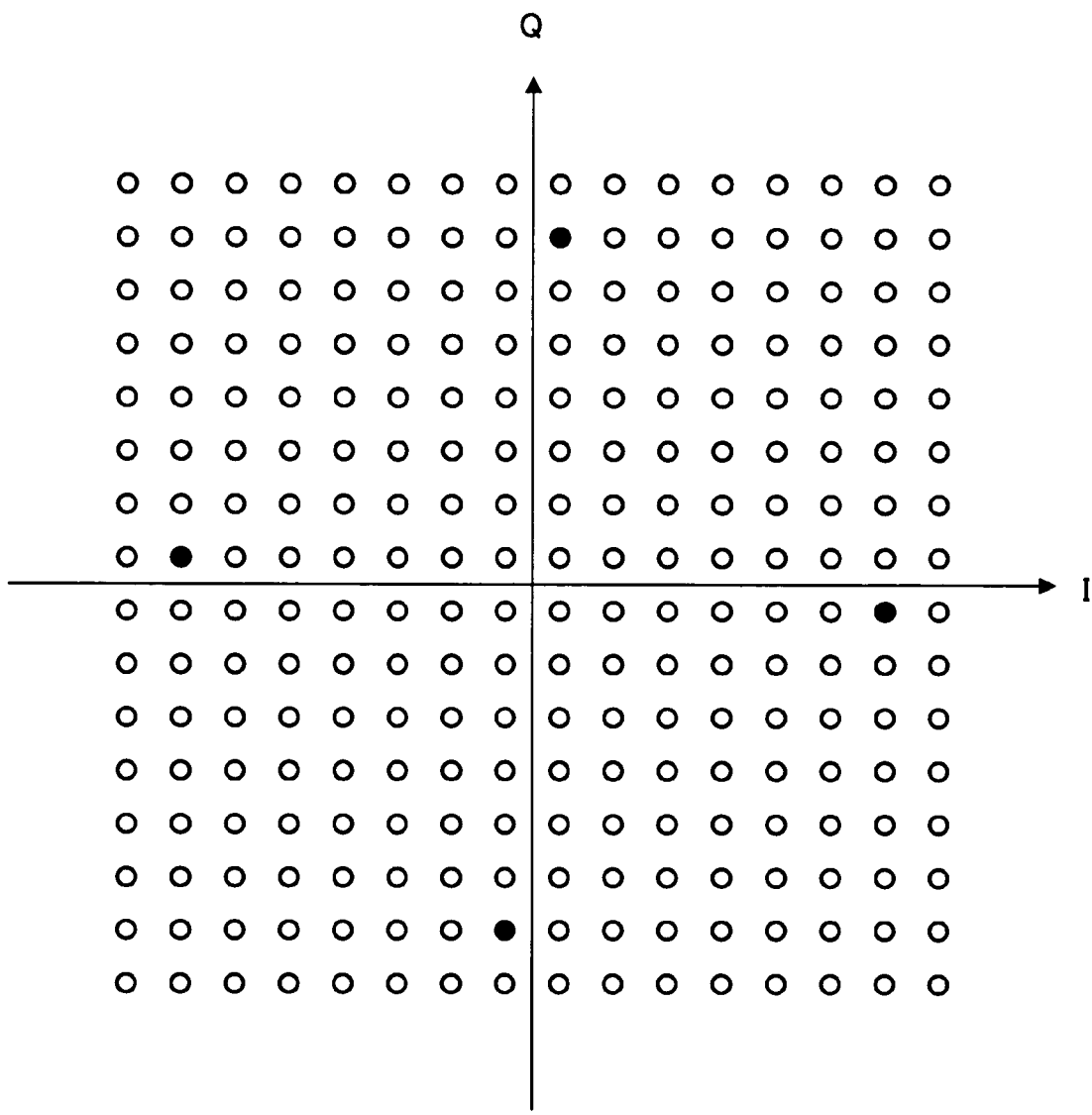
FIG. 8 is a diagram showing an arrangement of QPSK symbols subjected to phase rotation.

Phase rotation section 102 rotates the phase of the mapped symbol by 40.6° (26.6°+14.0°=40.6°). By this means, as shown in FIG. 8, four QPSK symbols are mapped on 256QAM symbols while being inclined 40.6°.

The phase-rotated symbol is separated into an I component and Q component in IQ separating section 103. Here, IQ separating section 103 separates the symbol with reference to an IQ axis inclined 14.0° from the original IQ axis. More specifically, the IQ separating section 103 inclines the ordinary IQ axis as shown in FIG. 8 by 14.0°, and separates the I component and Q component relative to the inclined IQ axis (which is referred to as deformed IQ separation).

The separated I component and Q component are temporarily stored in buffers 104 and 105 respectively. Q components stored in buffer 105 are interleaved in interleaver 106, and output to combining section 107.

Figures 9, 10:
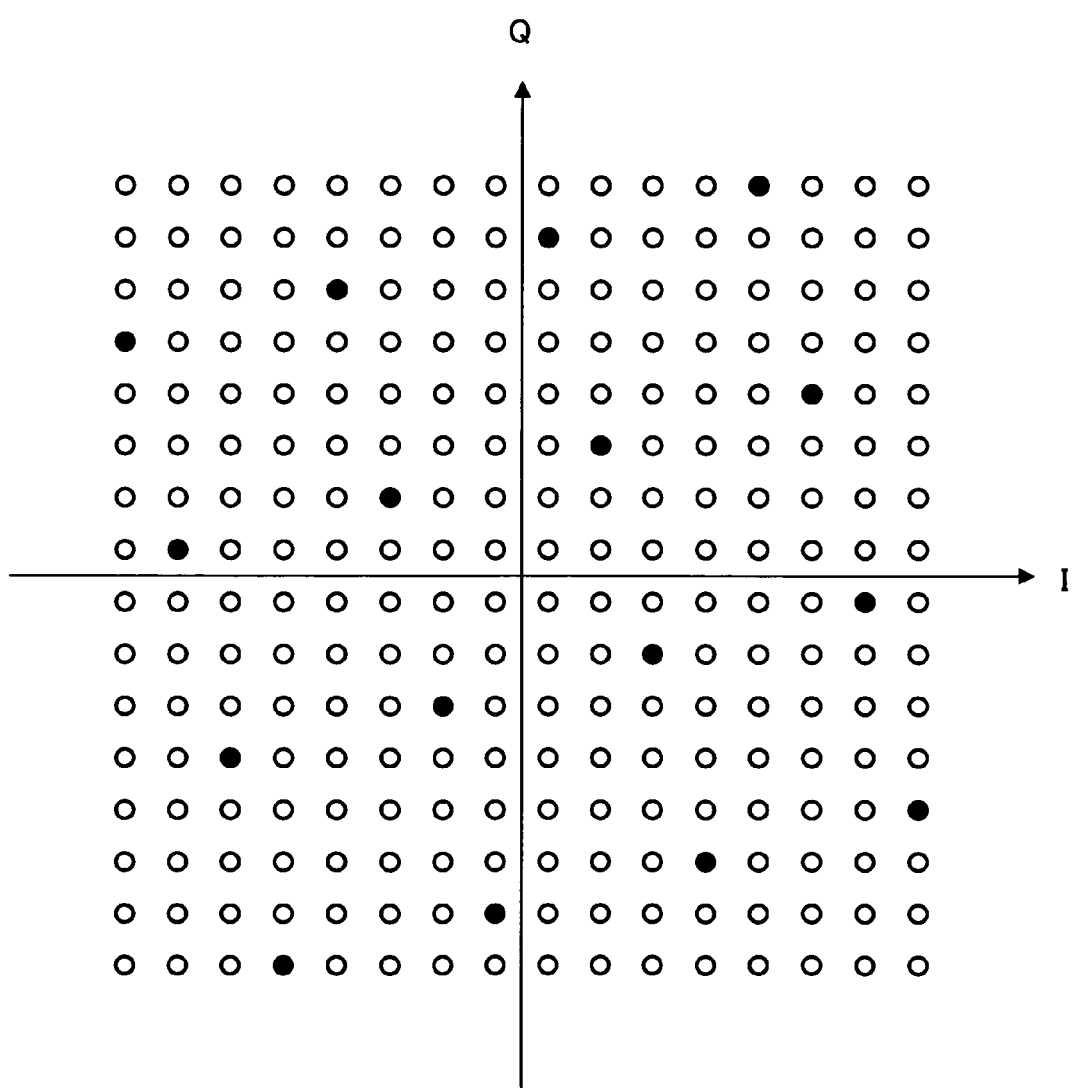
FIG. 9 is a diagram illustrating I components and Q components in combining in combining section 107.
FIG. 10 is a diagram showing a symbol arrangement after combining.

FIG. 9 illustrates I components and Q components when combined in combining section 107. Numerals "1" to "4" denote numbers of four QPSK symbols. Since I components are not interleaved, I components of modulation symbols are input to combining section 107 with the original order. In contrast thereto, the order of Q components of modulation symbols is changed by interleaving, and the rearranged Q components are input to combining section 107.

Combining section 107 combines the I component output from buffer 104 and the Q component output from interleaver 106 to place back in a constellation. The combined symbols output from combining section 107 thus have a constellation of 16QAM inclined 26.6° from the IQ axis. The symbols obtained by combining are output to IQ separating section 108.

IQ separating section 108 separates the input symbol into an I component and Q component. Here, IQ separating section 108 performs general IQ separation, instead of deformed IQ separation, which differs from IQ separating section 103 as described above. Separated I component and Q component are temporarily stored in buffers 109 and 110 respectively. Q components stored in buffer 110 undergo second interleaving processing in interleaver 111 and are output to combining section 112.

Figure 11:
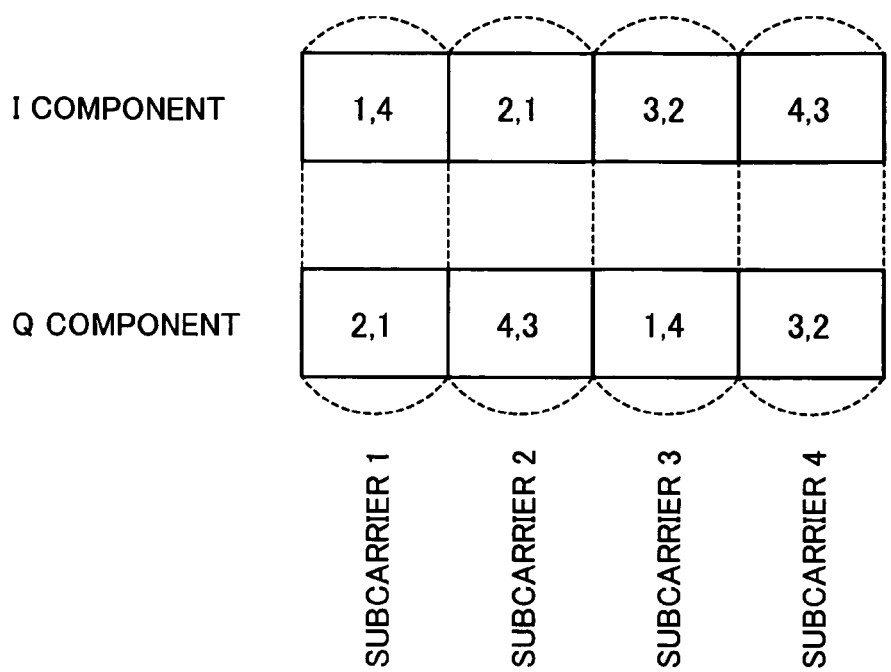
FIG. 11 is a diagram illustrating I components and Q components in combining in combining section 112.

FIG. 11 illustrates I components and Q components when combined in combining section 112. Here, as an interleaving pattern of interleaver 111, it is assumed that such a pattern is set that a first input signal is output third, a second input signal is output first, a third input signal is output fourth, and that a fourth input signal is output second. In addition, as an interleaving pattern of the above-mentioned first interleaver 106, as can be seen from FIG. 9, such a pattern is set that a first input signal is output second, a second input signal is output third, a third input signal is output fourth, and that a fourth input signal is output first.

Numerals "1" to "4" denote numbers of four QPSK symbols in FIG. 11. Here, when a signal subjected to first interleaving (i.e. the signal prior to combining in combining section 107) is represented as $S^1=[(S_{1I}^0, S_{4Q}^0), (S_{2I}^0, S_{1Q}^0), (S_{3I}^0, S_{2Q}^0), (S_{4I}^0, S_{3Q}^0)]$, a signal subjected to second interleaving (i.e. the signal prior to combining in combining section 112) can be represented as $S^2=[(S_{1I}^0, S_{2Q}^1), (S_{2I}^1, S_{4Q}^1), (S_{3I}^1, S_{1Q}^1), (S_{4I}^1, S_{3Q}^1)]$. At this point, as can be seen from FIG. 11, for example, $S_{1I}^1$ has components of original QPSK symbols 1 and 4. Similarly, $S_{2Q}^1$ has components of original QPSK symbols 2 and 1.

In addition, in the above-mentioned representation, numerical subscripts "1" to "4" respectively represent four symbols obtained in QPSK, a numerical superscript "0" represents a transmission symbol, and a numerical superscript "1" represents a signal subjected to the first interleaving processing. For example, symbol 1 subjected to mapping processing in mapping section 101 is represented as $S_1^0=(S_{1I}^0, S_{1Q}^0)$ using the I component and Q component.

Figure 12:
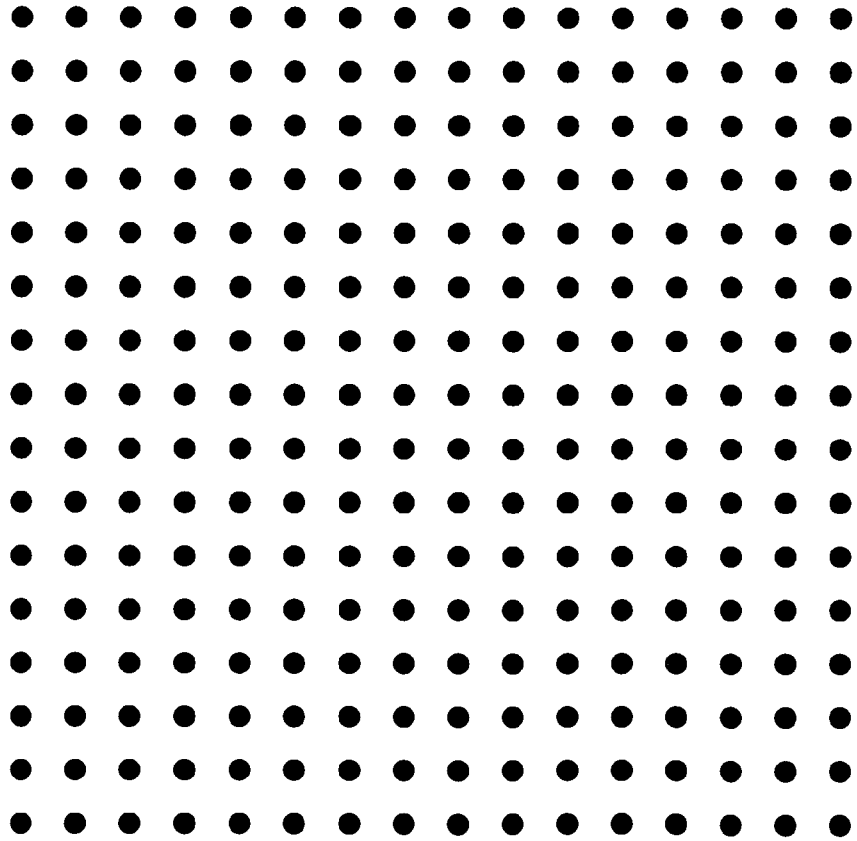
FIG. 12 is a diagram showing a symbol arrangement after combining.

Combining section 112 combines I component output from buffer 109 and Q component output from interleaver 111 to place back in a constellation. Combined symbols output from combining section 112 thus have a constellation of 256QAM as shown in FIG. 12. In this way, modulation diversity symbols are obtained which are subjected to modulation diversity processing twice.

The modulation diversity symbols are multiplexed on predetermined subcarriers in serial/parallel transform (S/P) section 113 and inverse fast Fourier transform (IFFT) section 114. In other words, serial/parallel transform (S/P) section 113 and inverse fast Fourier transform (IFFT) section 114 map the modulation diversity symbol to any one of a plurality of subcarriers orthogonal to one another, and sequentially modulates each of the subcarriers with the modulation diversity symbol. The IFFT-processed signal is subjected to radio transmission processing such as analog/digital conversion processing, upconverting and the like in radio transmission section 115, and transmitted via antenna 116.

The operation and effect of multicarrier transmission apparatus 100 of this Embodiment will be described below. In multicarrier transmission apparatus 100, as described above, phase rotation section 102 performs phase rotation processing of 40.6°=26.6°+14.0°, the interleaving processing is performed twice, before the IQ combining processing performed in combining section 107 and after the IQ separation processing performed in IQ separating section 108, and IQ components of QPSK symbols are thereby dispersed and mapped to/at signal points of 256QAM. As a result, a QPSK symbol is capable of obtaining the diversity gain of maximum four symbols as compared with conventional modulation diversity that obtains the diversity gain of two symbols.

Figure 5:
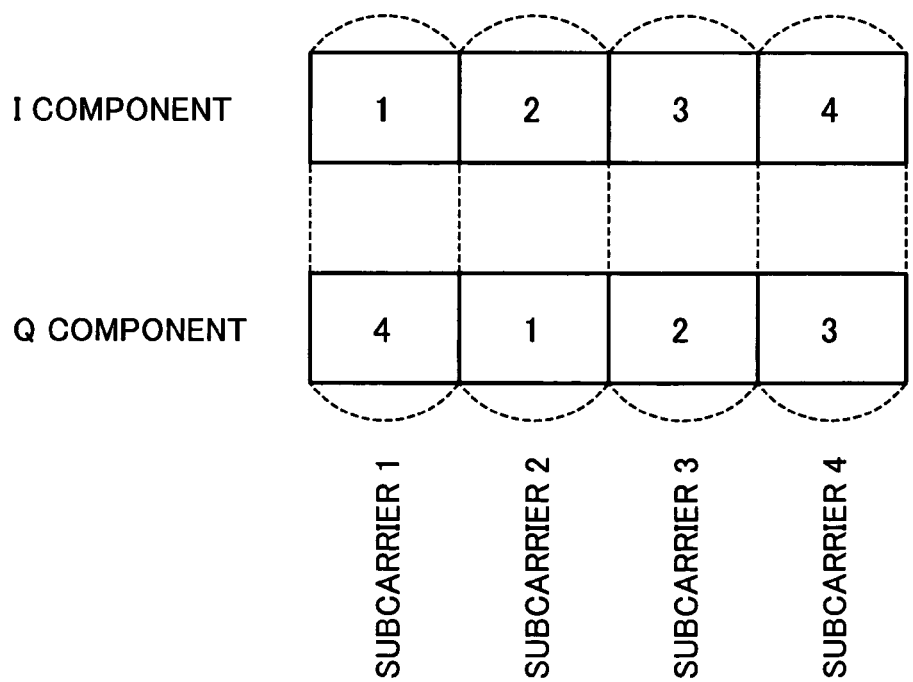
FIG. 5 is a diagram illustrating I components and Q components in combining.
Figure 6:
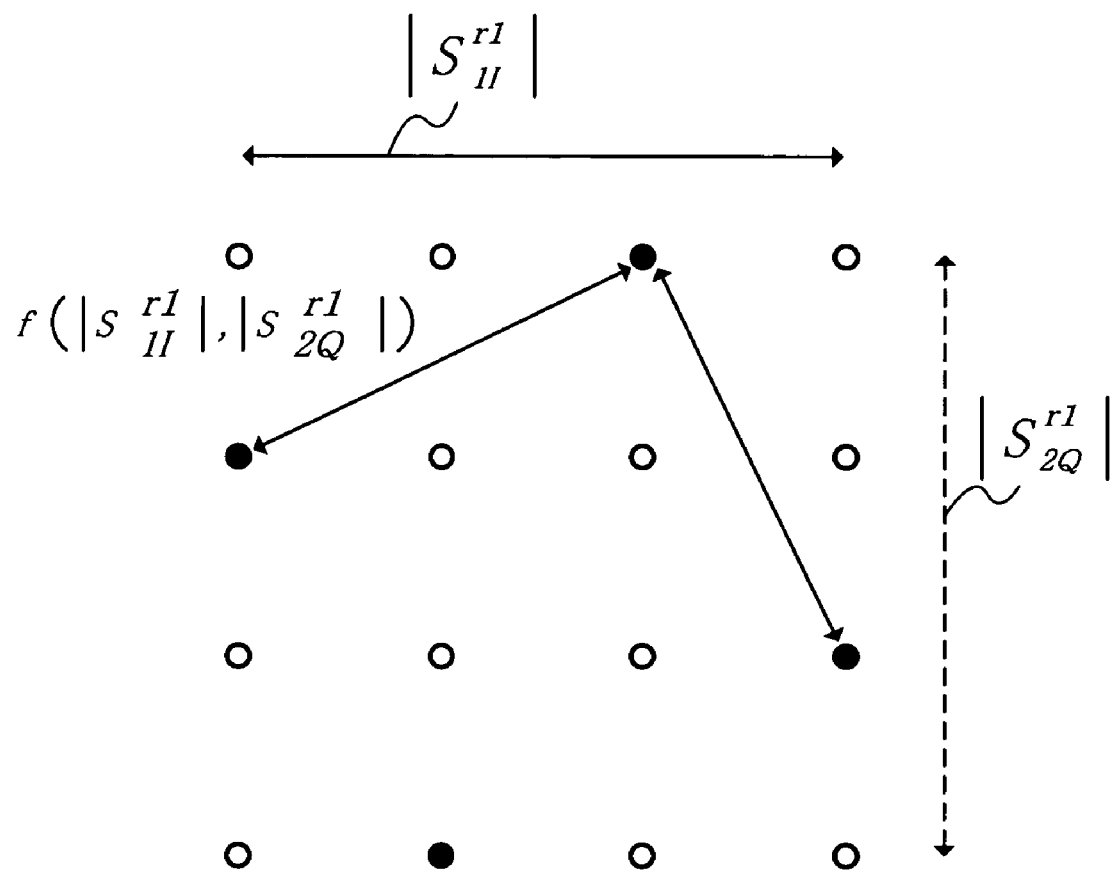
FIG. 6 is a diagram showing a constellation in obtaining an original symbol by combining.

For example, as shown in FIG. 11, subcarrier 1 is mapped components of three symbols except the third QPSK symbol, subcarriers 2 and 3 are mapped components of all the four symbols, and subcarrier 4 is mapped components of three symbols except the first QPSK symbol. As compared with the conventional modulation diversity system where each subcarrier is mapped components of only two symbols as shown in FIG. 5, it is understood that the diversity effect is significantly improved.

For example, in this Embodiment, if subcarrier 2 has good channel quality, even when subcarries except subcarrier 2 have poor channel quality, it is possible to maintain decision error characteristics of all the symbols at a certain level or more since subcarrier 2 contains components of all the four symbols. In contrast thereto, in conventional modulation diversity as shown in FIG. 5, if subcarries except subcarrier 2 have poor channel quality even when subcarrier 2 has good channel quality, although it is possible to maintain decision error characteristics of two symbols, 1 and 2, at a certain level or more, it is not possible to maintain decision error characteristics of two symbols, 3 and 4.

Thus, according to this Embodiment, phase rotation section 102 performs the phase rotation processing of 40.6°=26.6°+14.0° and the interleaving processing is performed twice before the IQ combining processing performed in combining section 107 and after the IQ separation processing performed IQ separating section 108. And therefore, it is possible to implement multicarrier transmission apparatus 100 with the modulation diversity effect improved.

EMBODIMENT 2

Figure 13:
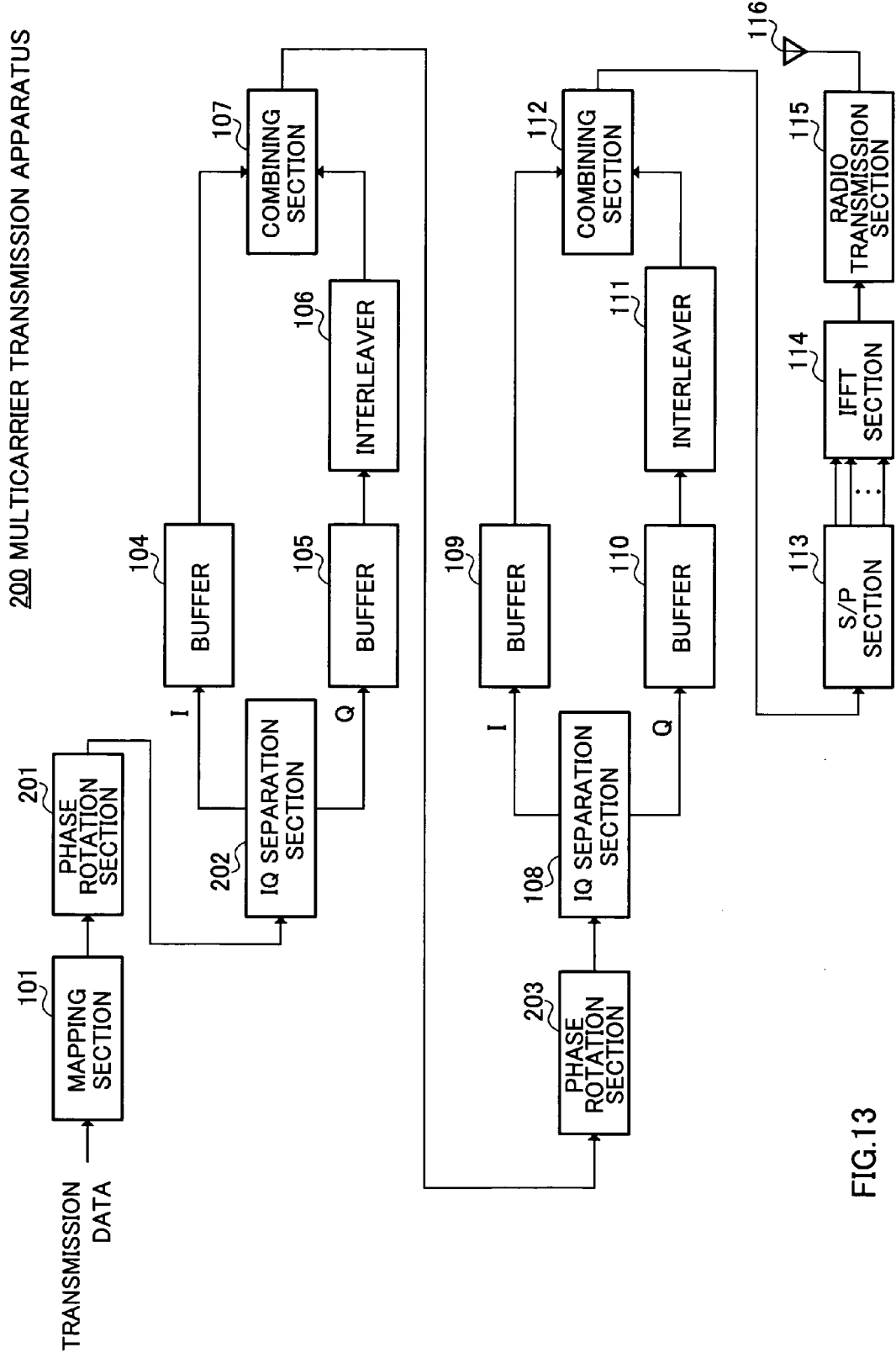
FIG. 13 is a block diagram illustrating a configuration of a multicarrier transmission apparatus according to Embodiment 2 of the invention.

FIG. 13 illustrates a multicarrier transmission apparatus of this Embodiment with corresponding portions in FIG. 7 assigned the same reference numerals. Multicarrier transmission apparatus 200 has the same configuration as that of multicarrier transmission apparatus 100 except that configurations of phase rotation section 201 and IQ separating section 202 are different and that the apparatus 200 has phase rotation section 203.

Figure 1:
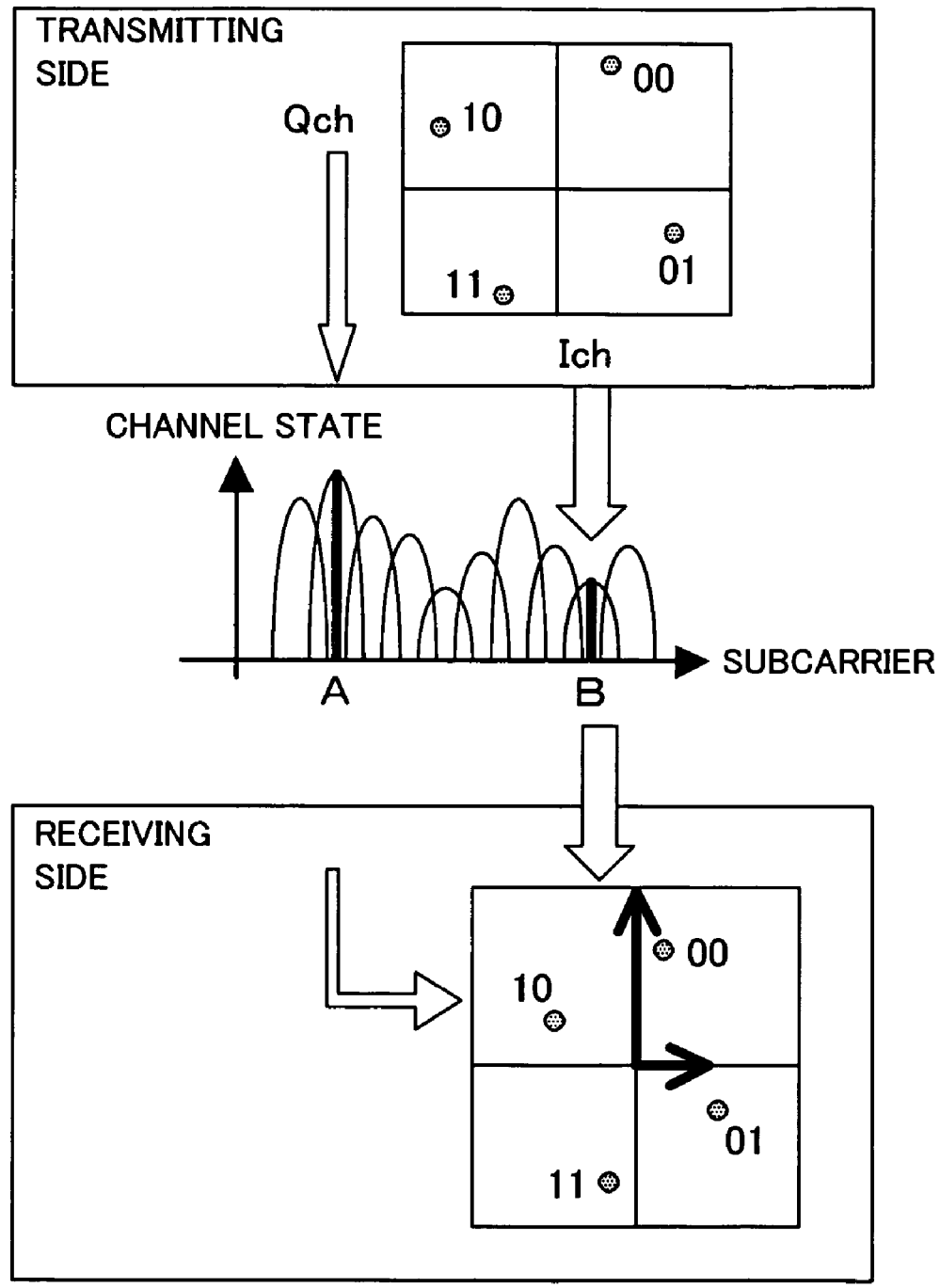
FIG. 1 is a view to explain modulation diversity.
Figure 2:
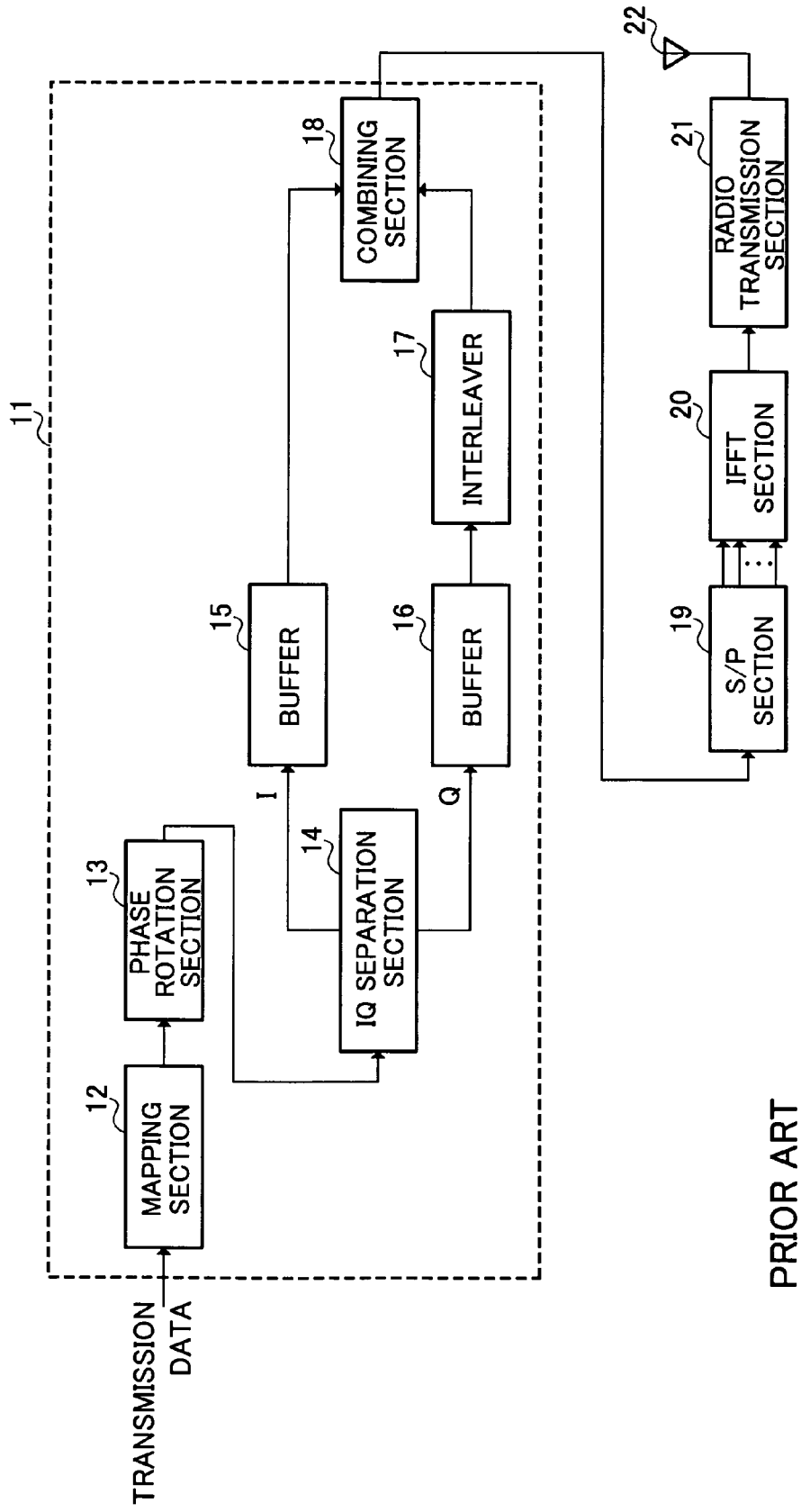
FIG. 2 is a block diagram illustrating a configuration of a conventional multicarrier transmission apparatus to which a modulation diversity system is applied.
Figure 3:
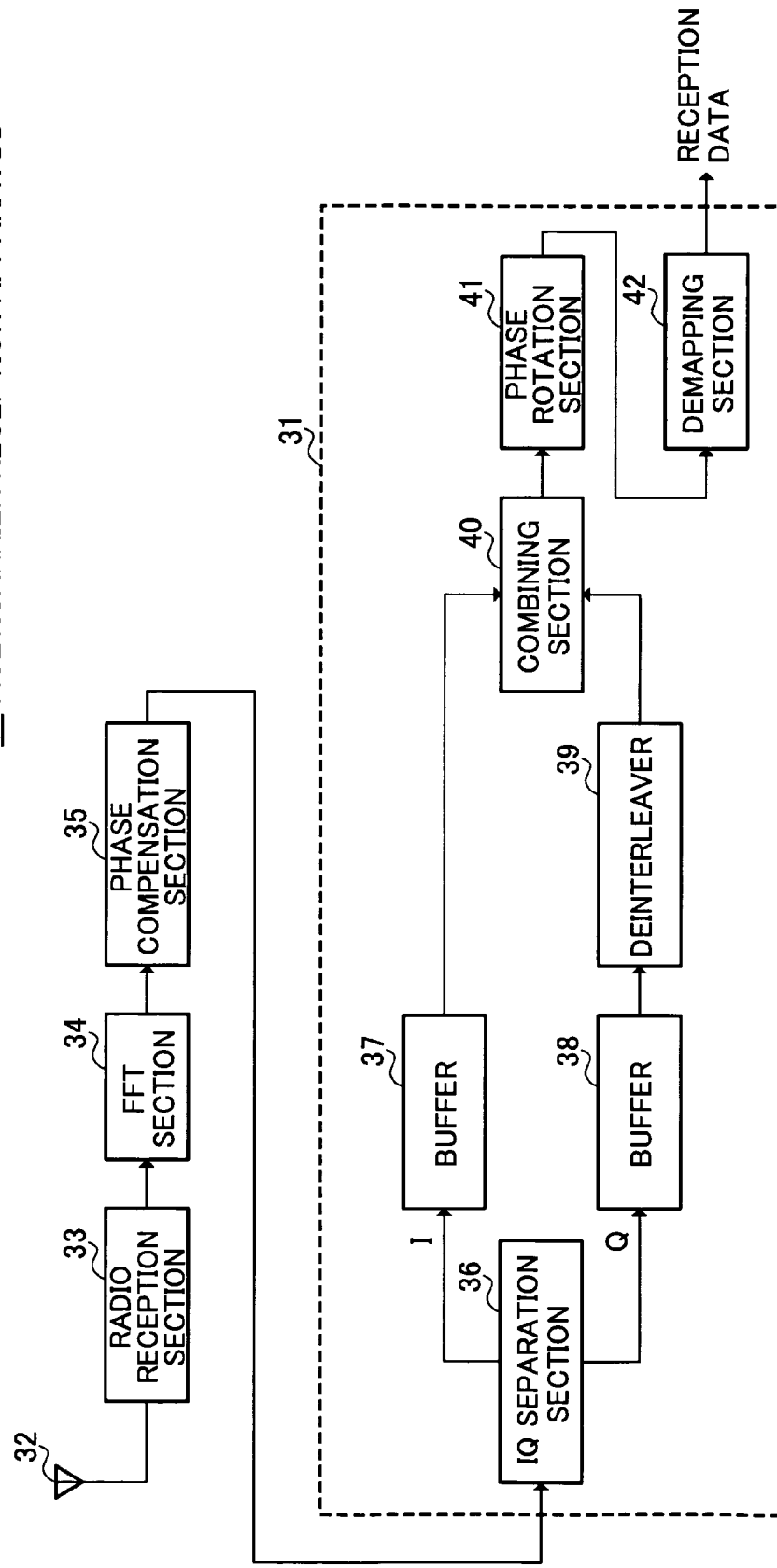
FIG. 3 is a block diagram illustrating a configuration of a conventional multicarrier reception apparatus.
Figure 4:
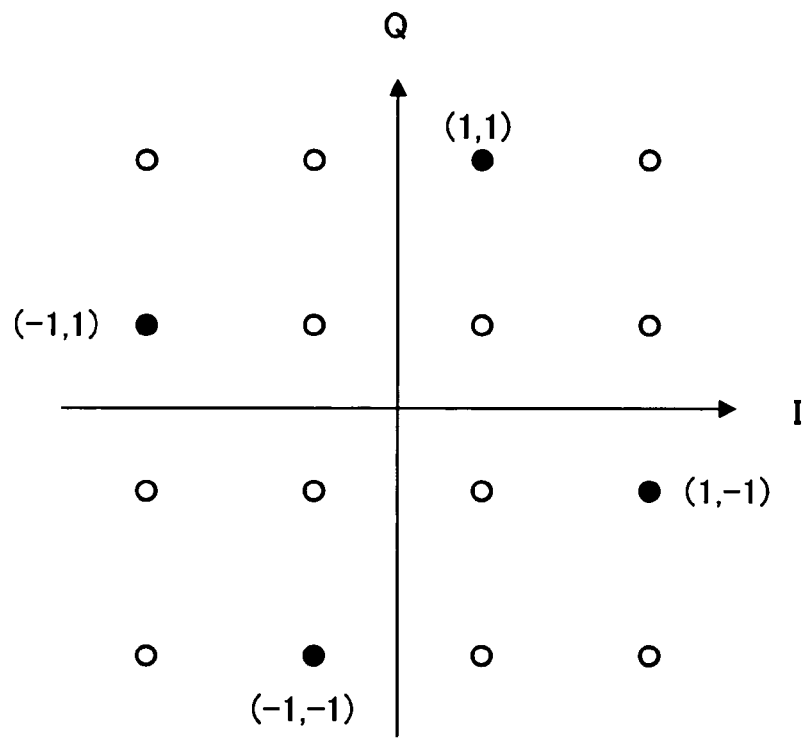
FIG. 4 is a diagram illustrating an arrangement of modulation symbols subjected to phase rotation.

Phase rotation section 201 rotates the phase of the mapped QPSK symbol by 26.6°. By this means, as shown in FIG. 4, four QPSK symbols are mapped on 16QAM symbols while being inclined 26.6°.

IQ separating section 202 performs general IQ separation, although IQ separating section 103 performs deformed IQ separation in Embodiment 1. In other words, in multicarrier transmission apparatus 200, the processing up to combining section 107 is performed in the same way as in conventional modulation diversity.

Phase rotation section 203 rotates the phase of the symbol output from combining section 107 by 14.0°. By this means, as shown in FIG. 10, 16QAM symbols are mapped at signal points of 256QAM while being inclined 14.0°. The subsequent processing is the same as in Embodiment 1.

In other words, in Embodiment 1, phase rotation section 102 performs the phase rotation processing of 40.6°=26.6°+14.0°, QPSK symbols are thereby mapped at signal points of 256QAM one time while being inclined, and IQ separating section 103 performs the deformed IQ separation. In contrast thereto, in this Embodiment, two phase rotation sections, 201 and 203, are provided to map QPSK symbols on 16QAM and then on 256QAM successively at an angel of predetermined degrees, and the symbols are subjected to the interleaving processing.

Thus, this Embodiment are provided with first phase rotation section 201 that rotates the phase of a modulation symbol by 26.6°, first IQ separating section 202, first interleaver 106, first IQ combining section 107, second phase rotation section 203 that rotates the symbol obtained by combining by 14.0°, second IQ separating section 108, second interleaver 111, second IQ combining section 112, and a transmitting section that transmits the symbol obtained in second IQ combining section 112, and it is thereby possible to implement multicarrier transmission apparatus 200 with the modulation diversity effect improved, as in Embodiment 1.

EMBODIMENT 3

Figure 14:
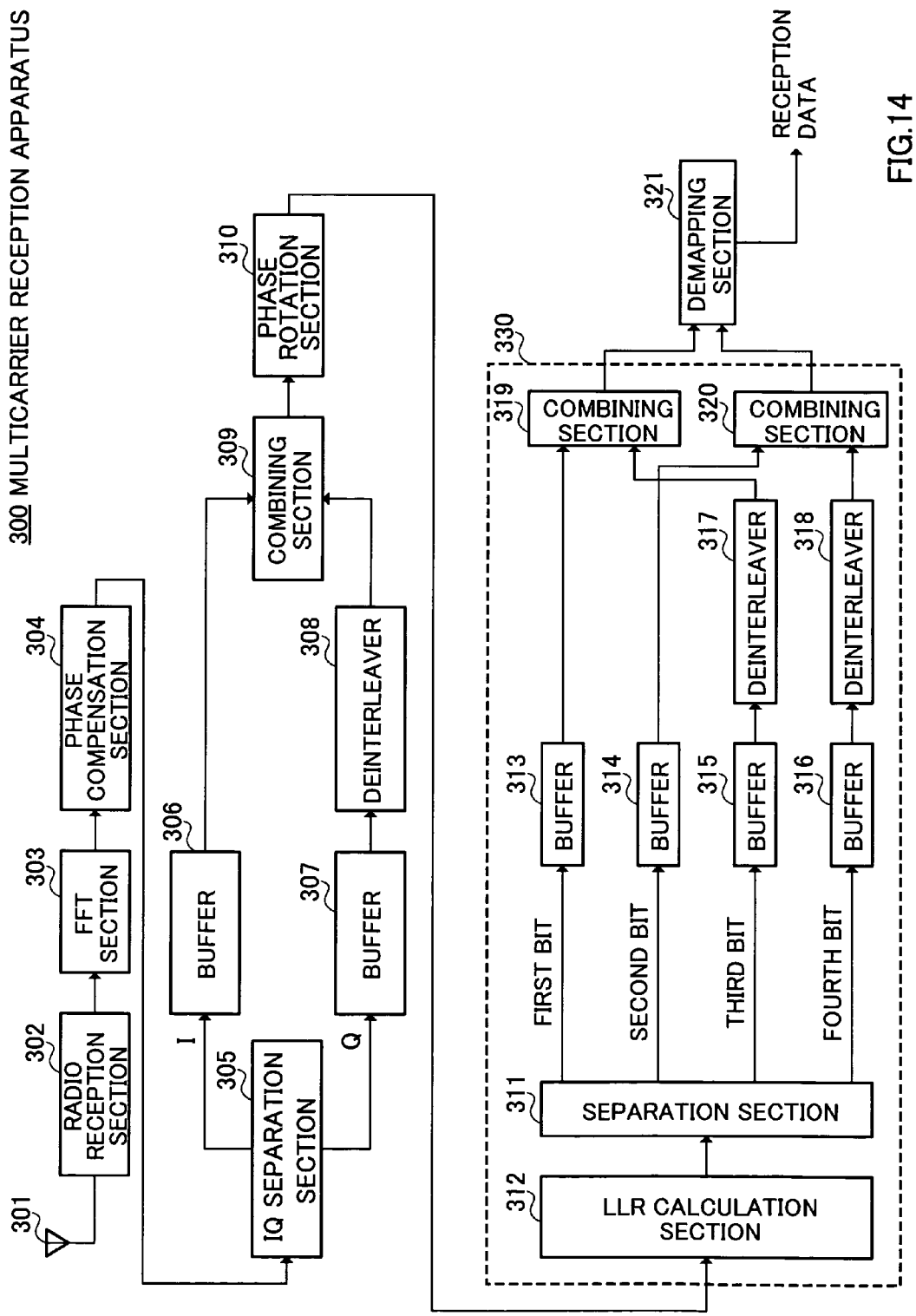
FIG. 14 is a block diagram illustrating a configuration of a multicarrier reception apparatus according to Embodiment 3 of the invention.

This Embodiment proposes a multicarrier reception apparatus that receives and demodulates signals from the multicarrier transmission apparatus as described in Embodiments 1 and 2. FIG. 14 illustrates a configuration of the multicarrier reception apparatus of this Embodiment.

In multicarrier reception apparatus 300, radio reception section 302 subject a radio signal received in antenna 301 to radio reception processing such as downconverting, analog/digital conversion processing and the like and output to fast Fourier transform (FFT) section 303. FFT section 303 extracts modulation diversity symbols multiplexed on each subcarrier. Phase compensating section 304 compensates the extracted modulation diversity symbol for a phase variation developed during propagation. The phase-compensated modulation diversity symbol is output to IQ separating section 305.

IQ separating section 305 separates each symbol into an I component and a Q component. Of the separated components, IQ separating section 305 outputs the I component to combining section 309 via buffer 306 without any processing, while outputting the Q component to deinterleaver 308 via buffer 307. Deinterleaver 308 performs processing inverse to that in interleaver 111 (FIGS. 7 and 13), and thereby restores Q components interleaved in second interleaving to an original arrangement and outputs to combining section 309. Consequently, combining section 309 forms symbols of 16QAM as a result of combining. An output of combining section 309 is output to phase rotation section 310.

Phase rotation section 310 rotates the phase of the input 16QAM symbol by −14.0°. The 16QAM symbol is output to LLR calculating section 312 in LLR combining section 330.

LLR calculating section 312 calculates values of Log Likelihood Ratio (LLR) of four bits of the input 16QAM symbol, and outputs the values of LLR to separating section 311. The processing in LLR calculating section 312 will specifically be described below. 16QAM symbols input to LLR calculating section 312 are explained in a following example. Here, when it is assumed that data of QPSK (data of mapping section 101) is (0,0), (1,0), (0,1) and (1,1) and that an interleaving pattern as shown in FIG. 9 is used, an output subsequent to modulation diversity combining is of some point expressed in a constellation as shown in FIG. 15. When the interleaving pattern as shown in FIG. 9 is used, a first symbol is (0,0,1,1), a second symbol is (1,0,0,0), a third symbol is (0,1,1,0), and a fourth symbol is (1,1,0,1).

Figure 16:
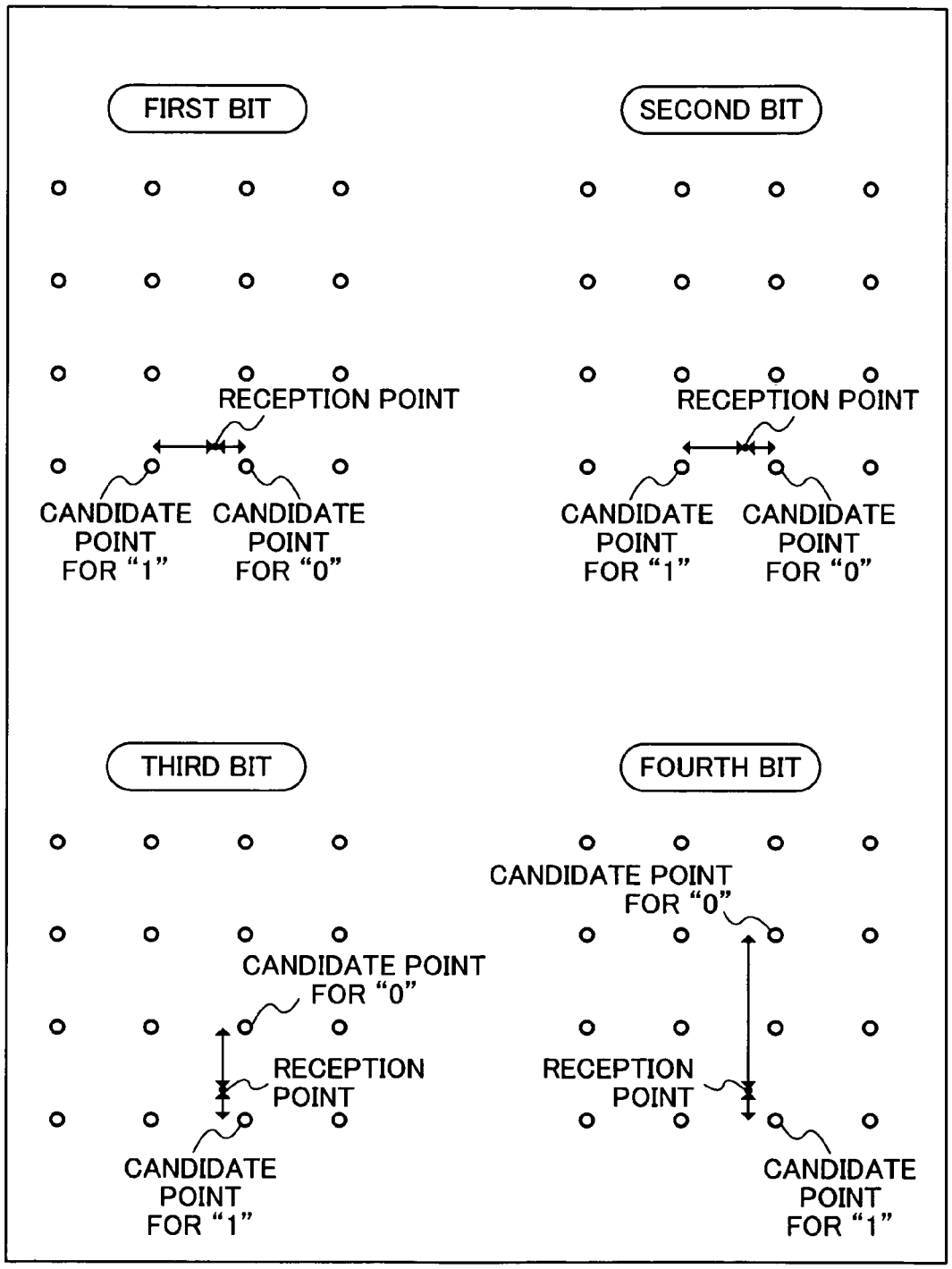
FIG. 16 is a diagram to explain LLR calculation for each bit.
Figure 17:
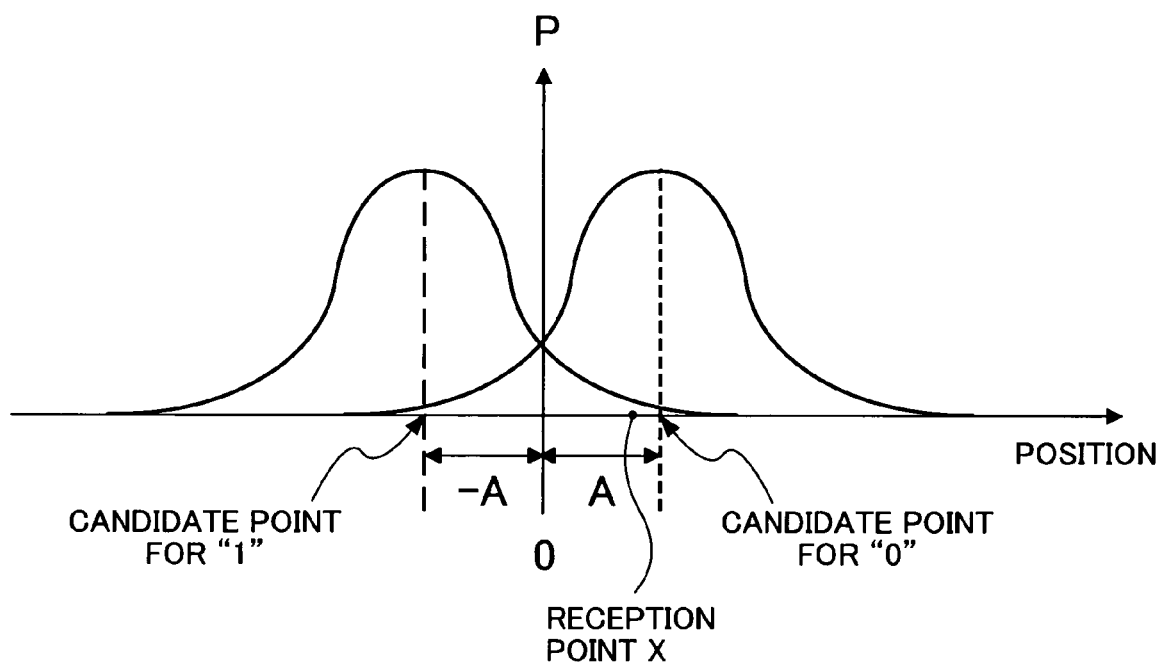
FIG. 17 is a chart to explain LLR calculation.

LLR calculating section 312 calculates LLR for each bit. LLR calculation of the first symbol is considered. FIG. 16 illustrates LLR calculation for each bit. In FIG. 16, o represents a candidate point for "0" or "1", and ● represents a reception point. As can be seen from the figure, with respect to the first bit and second bit, a value ("1" or "0") of the bit is obtained by placing a candidate point in the I-axis direction and performing LLR calculation between the reception point and candidate point. With respect to the third bit and fourth bit, a value of the bit is obtained by placing a candidate point in the Q-axis direction and performing LLR calculation between the reception point and candidate point. As is well known, as shown in FIG. 17, LLR calculation is performed as expressed in the following equation, where a noise probability density is P, a distance from the origin to a candidate point for "0" is A, a distance from the origin to a candidate point for "1" is −A, a reception point is x, and noise dispersion is $\sigma^2$:

$$LLR = \frac{e^{-(x+A)/2\sigma^2}}{e^{-(x-A)/2\sigma^2}} \quad (1)$$

Here, the first bit is paired with the third bit, and the second bit is paired with the fourth bit. Therefore, after separating section 311 separates values of LLR of bits, the third bit and fourth bit are deinterleaved in deinterleavers 317 and 318 respectively, and the first bit and deinterleaved third bit are combined in combining section 319, while the second bit and deinterleaved fourth bit are combined in combining section 320. QPSK symbols are thus obtained, the QPSK symbols undergo demapping in demapping section 321, and reception data is obtained.

The operation and effect of multicarrier reception apparatus 300 of this Embodiment will be described below. Multicarrier reception apparatus 300 first performs the same demodulation processing as in demodulation in conventional modulation diversity in IQ separating section 305, deinterleaver 308 and combining section 309, and thereby forms 16QAM symbols.

At this point, since different fading is imposed on each symbol, the constellation is not of a square. Therefore, it is not possible to perform second demodulation processing by the same demodulation processing as the conventional processing. Thus, in multicarrier reception apparatus 300, LLR calculating section 312 calculates likelihood for each bit, and separating section 311 separates the likelihood for each bit. Then, performing LLR combining processing obtains I components and Q components of original modulation symbols (QPSK symbols in this Embodiment). It is thereby possible to restore original modulation symbols from symbols that are performed the modulation diversity processing a plurality of times and transmitted from the transmitting side.

Thus, according to this Embodiment, providing LLR combining section 330 makes it possible to excellently restore original modulation symbols from received signals subjected to the plurality-of-time modulation diversity processing and demodulate the received signals.

In addition, although each of the above-mentioned Embodiments describes the case of interleaving Q components, I components may be interleaved, or both of I components and Q components may be interleaved.

Further, above-mentioned Embodiment 1 describes the case where mapping section 101 performs QPSK modulation processing, phase rotation section 102 rotates the phase by 26.6°+14.0°, IQ separating section 103 separates the I component and the Q component with reference to the IQ axis inclined 14.0°, and 256QAM modulation diversity symbols are thus obtained from QPSK symbols. However, the invention is not limited to such a case. When mapping section 101 performs BPSK modulation processing, phase rotation section 102 rotates the phase by 45.0°+26.6°, and IQ separating section 103 separates the I component and the Q component with reference to the IQ axis inclined 26.6°, it is possible to obtain 16QAM modulation diversity symbols from BPSK symbols.

Similarly, above-mentioned Embodiment 2 describes the case where mapping section 101 performs QPSK modulation processing, phase rotation section 201 rotates the phase by 26.6°, while phase rotation section 203 rotates the phase by 14.4°, and 256QAM modulation diversity symbols are thus obtained from QPSK symbols. However, the present invention is not limited to such a case. When mapping section 101 performs BPSK modulation processing, and phase rotation section 201 rotates the phase by 45.0°, while phase rotation section 203 rotates the phase by 26.6°, it is possible to obtain 16QAM modulation diversity symbols from BPSK symbols.

Further, each of the above-mentioned Embodiments describes specific numeric values as phase rotation angles. With respect to modulation schemes such as BPSK, QPSK, 16QAM, 64QAM and the like with an even-numbered M-ary number, the phase rotation angle in each modulation scheme to perform modulation diversity modulation is expressed in the following equation generally.

$$\tan(\theta)=1/n \text{ (}n \text{ is a modulation level)} \quad (2)$$

Accordingly, in the present invention, when an original modulation symbol is mapped at a signal point of a higher modulation level by two ranks or more, the phase rotation processing is performed in consideration of equation (2). In addition, angles 26.6° and 14.0° used in the above-described embodiments are values meeting $\tan(\theta)=\frac{1}{2}$ and $\tan(\theta)=\frac{1}{4}$ respectively, and both angles are values conforming to equation.(2).

Further, each of the above-mentioned Embodiments describes the case where the present invention is applied to multicarrier transmission apparatuses 100 and 200, but the invention is not limited to the multicarrier transmission apparatus, and is widely applied to cases of performing the modulation diversity processing.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No.2003-341653 filed on Sep. 30, 2003, entire content of which is expressly incorporated by reference herein.

INDUSTRIAL APPLICABILITY

The present invention is suitable for use in radio communication systems requiring further improvements in modulation diversity effect such as OFDM communication, for example.

The invention claimed is:

1. A radio transmission apparatus comprising:
   a modulator that maps transmission data on a modulation symbol comprised of an I component and a Q component;
   a phase rotator which rotates a phase of the modulation symbol by a predetermined angle and maps a signal point of the modulation symbol at a signal point of an M-ary modulation level higher by two ranks;
   a first IQ separator that separates the modulation symbol with the phase rotated to the I component and the Q component with reference to an IQ axis rotated a predetermined angle;
   a first interleaver that interleaves the I component and/or the Q component separated in the first IQ separator;
   a first IQ combiner that combines the I component and the Q component output from the first interleaver;
   a second IQ separator that separates the modulation symbol obtained in the first IQ combiner into the I component and the Q component;
   a second interleaver that interleaves the I component and/or the Q component separated in the second IQ separator;
   a second IQ combiner that combines the I component and the Q component output from the second interleaver; and
   a transmitter that transmits the symbol obtained in the second IQ combiner.

2. The radio transmission apparatus according to claim 1, wherein the modulator performs QPSK modulation, the phase rotator rotates the phase by 26.6°+14.0°, and the first IQ separator separates into the I component and the Q component with reference to the IQ axis inclined 14.0°.

3. The radio transmission apparatus according to claim 1, wherein the modulator performs BPSK modulation, the phase rotator rotates the phase by 45.0°+26.6°, and the first IQ separator separates into the I component and the Q component with reference to the IQ axis inclined 26,6°.

4. The radio transmission apparatus according to claim 1, wherein the transmitter maps the symbol obtained in the second IQ combiner to one of a plurality of subcarriers orthogonal to each other, and thereby modulates each of the subcarriers with the symbol mapped to transmit.

5. A radio transmission apparatus comprising:
   a modulator that maps transmission data on a modulation symbol comprised of an I component and a Q component;
   a first phase rotator that rotates a phase of the modulation symbol by a predetermined angle and maps a signal point of the modulation symbol at a signal point of a one-rank higher M-ary modulation level;
   a first IQ separator that separates the modulation symbol with the phase rotated to the I component and the Q component;
   a first interleaver that interleaves the I component and/or the Q component separated in the first IQ separator;
   a first JQ combiner that combines the I component and the Q component output from the first interleaver;
   a second phase rotator which rotates a phase of the modulation symbol obtained in the first IQ combiner by a predetermined angle and maps a signal point of the modulation symbol at a signal point of a one-rank higher M-ary modulation level;
   a second IQ separator that separates the modulation symbol with the phase rotated into the I component and the Q component;
   a second interleaver that interleaves the I component and/or the Q component separated in the second IQ separator;
   a second IQ combiner that combines the I component and the Q component output from the second interleaver; and
   a transmitter that transmits the symbol obtained in the second IQ combiner.

6. The radio transmission apparatus according to claim 5, wherein the modulator performs QPSK modulation, the first phase rotator rotates the phase by 26.6°, and the second phase rotator rotates the phase by 140°.

7. The radio transmission apparatus according to claim 5, wherein the modulator performs BPSK modulation, the first phase rotator rotates the phase by 45.0°, and the second phase rotator rotates the phase by 26.6°.

8. The radio transmission apparatus according to claim 5, wherein the transmitter maps the symbol obtained in the second IQ combiner to one of a plurality of subcarriers orthogonal to each other, and thereby modulates each of the subcarriers with the symbol mapped to transmit.

9. A radio reception apparatus comprising:
   an IQ separator that separates a received signal into an I component and a Q component;
   a deinterleaver that performs deinterleaving processing on the I component and/or the Q component separated;
   an IQ combiner that combines deinterleaved components;
   a phase rotator that rotates a phase of a symbol combined in the IQ combiner by a predetermined angle;
   an LLR combiner that calculates log-likelihood ratio (LLR) for each bit in the symbol with the phase rotated, separates a value of LLR for each bit into an I component and a Q component, performs deinterleaving processing on a value of LLR for each bit of the I component and/or the Q component, and combines values of LLR of the I component and the Q component subjected to deinterleaving; and
   a demodulator that demaps a symbol subjected to LLR combining to obtain reception data.

* * * * *

UNITED STATES PATENT AND TRADEMARK OFFICE
CERTIFICATE OF CORRECTION

PATENT NO. : 7,545,873 B2  Page 1 of 1
APPLICATION NO. : 10/573817
DATED : June 9, 2009
INVENTOR(S) : Isamu Yoshii et al.

It is certified that error appears in the above-identified patent and that said Letters Patent is hereby corrected as shown below:

Claim 5, column 14, lines 11 and 12 of the Letters Patent currently read:

"a first JQ combiner that combines the I component and the Q component output from the first interleaver"

and should read:

"a first IQ combiner that combines the I component and the Q component output from the first interleaver"

Signed and Sealed this

Twenty-second Day of December, 2009

David J. Kappos
*Director of the United States Patent and Trademark Office*